United States Patent
Gosis et al.

(10) Patent No.: US 6,854,710 B2
(45) Date of Patent: Feb. 15, 2005

(54) VALVE ASSEMBLY

(75) Inventors: Anatoly Gosis, Palatine, IL (US);
Terrence P. Meier, Naperville, IL (US);
James S. Zielinski, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 332 days.

(21) Appl. No.: 10/001,371

(22) Filed: Oct. 25, 2001

(65) Prior Publication Data

US 2003/0080309 A1 May 1, 2003

(51) Int. Cl.$^7$ .............................................. F16K 1/226
(52) U.S. Cl. ...................................... 251/305; 251/316
(58) Field of Search ................................ 251/305, 306, 251/309, 314, 316, 317, 317.01; 222/105

(56) References Cited

U.S. PATENT DOCUMENTS

| | | | | |
|---|---|---|---|---|
| 299,734 A | * | 6/1884 | Callahan ..................... 251/306 |
| 714,410 A | * | 11/1902 | Stainton et al. ............. 251/305 |
| 3,078,070 A | * | 2/1963 | Cooper ........................ 251/306 |
| 3,108,778 A | * | 10/1963 | Rader ...................... 251/306 X |
| 3,373,968 A | | 3/1968 | Scaramucci |
| 3,799,499 A | * | 3/1974 | Shur ........................ 251/309 X |
| 3,938,553 A | | 2/1976 | Ortega .................... 137/625.47 |
| 4,022,258 A | | 5/1977 | Steidley ....................... 141/330 |
| 4,201,208 A | | 5/1980 | Cambio, Jr. .............. 128/214.2 |
| 4,322,018 A | | 3/1982 | Rutter .......................... 222/83 |
| 4,339,110 A | * | 7/1982 | Ortega ........................ 251/309 |
| 4,516,692 A | | 5/1985 | Croley ........................ 222/105 |
| 4,538,789 A | * | 9/1985 | An ........................... 251/129.12 |
| 4,796,788 A | | 1/1989 | Bond ........................... 222/94 |
| 4,966,310 A | | 10/1990 | Hawkins ..................... 222/105 |
| 5,067,636 A | | 11/1991 | Pfeiffer et al. .............. 222/105 |
| 5,163,485 A | | 11/1992 | Hermann ...................... 141/10 |
| 5,335,820 A | | 8/1994 | Christianson ............... 222/105 |
| 5,375,741 A | | 12/1994 | Harris ......................... 222/105 |
| 5,377,876 A | | 1/1995 | Smernoff ..................... 222/105 |
| 5,385,233 A | | 1/1995 | McKibben et al. ......... 206/386 |
| 5,433,345 A | * | 7/1995 | Sasaki et al. ........... 222/105 X |
| 5,704,590 A | | 1/1998 | Pfeiffer ........................ 251/312 |
| 5,794,818 A | | 8/1998 | Bromwell et al. .......... 222/105 |
| 6,047,951 A | * | 4/2000 | Ito et al. .................. 251/306 X |
| 6,050,455 A | | 4/2000 | Soehnlen et al. ........ 222/185.1 |
| 6,050,545 A | | 4/2000 | Stolzman ............... 251/315.05 |
| 6,123,122 A | | 9/2000 | Dushman ..................... 141/348 |
| 6,164,888 A | | 12/2000 | Kocks ......................... 411/428 |

FOREIGN PATENT DOCUMENTS

| | | |
|---|---|---|
| EP | 0 529 186 B1 | 3/1993 |
| EP | 0 581 637 B1 | 2/1994 |
| EP | 0 748 969 A1 | 12/1996 |
| EP | 1 018 614 A2 | 7/2000 |
| EP | 1 098 118 A2 | 5/2001 |
| WO | WO 97/00401 | 1/1997 |
| WO | WO 97/35132 | 9/1997 |
| WO | WO 00/19133 | 4/2000 |

* cited by examiner

Primary Examiner—Eric Keasel
(74) Attorney, Agent, or Firm—Mark W. Croll; Paul F. Donovan

(57) ABSTRACT

A valve assembly including a valve body having an elongated passage through which product flows and a valve element which rotates about an axis extending generally normal to an axis defined by the passage in the valve body is disclosed. The valve element is mounted in the valve body passage to control product flow through the passage as a function of the position of the valve element. The diameter of a valve body bore within which the valve element rotates is equal to or greater than the passage it seals. A seal structure cooperates with the valve element to selectively seal the passage.

18 Claims, 3 Drawing Sheets

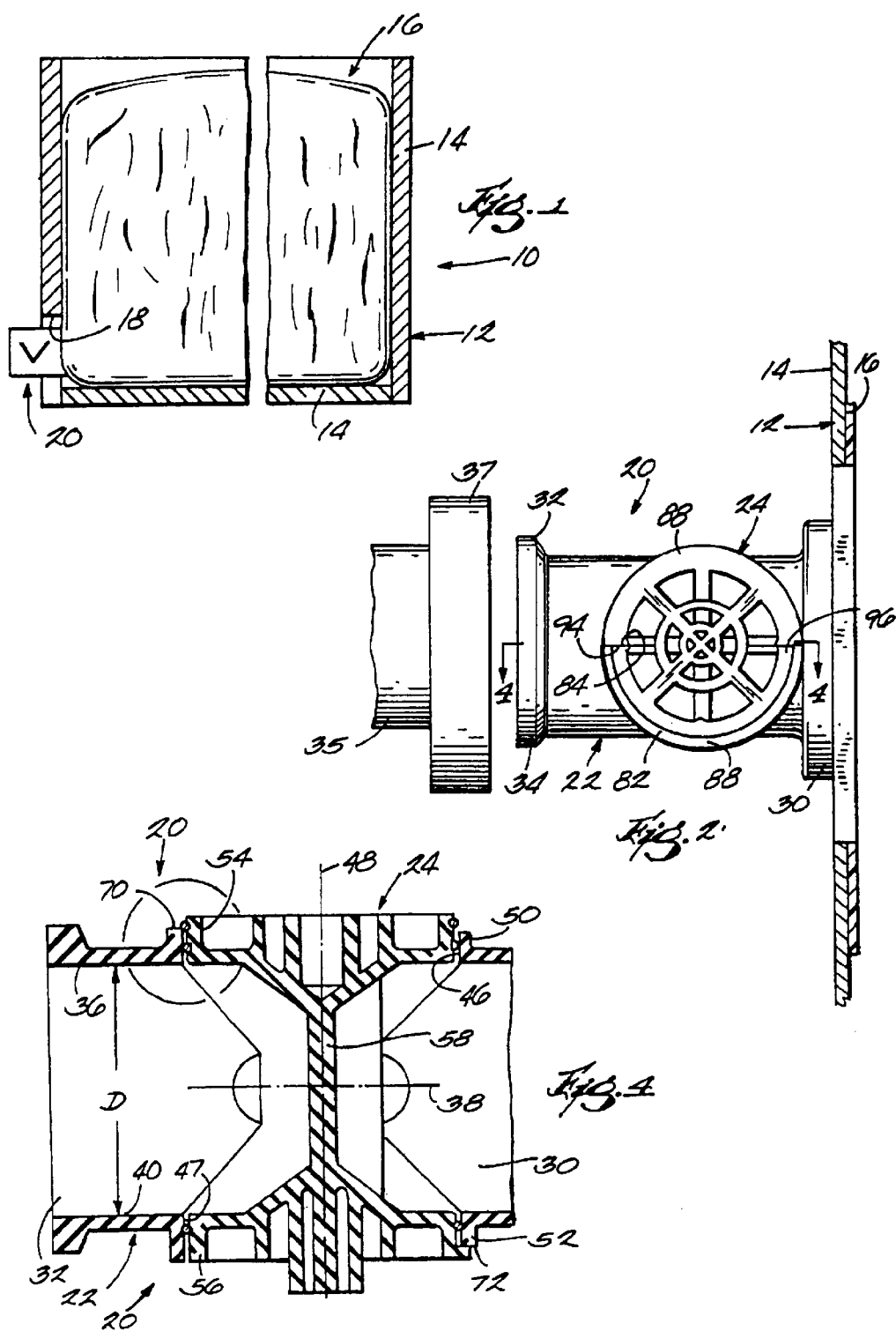

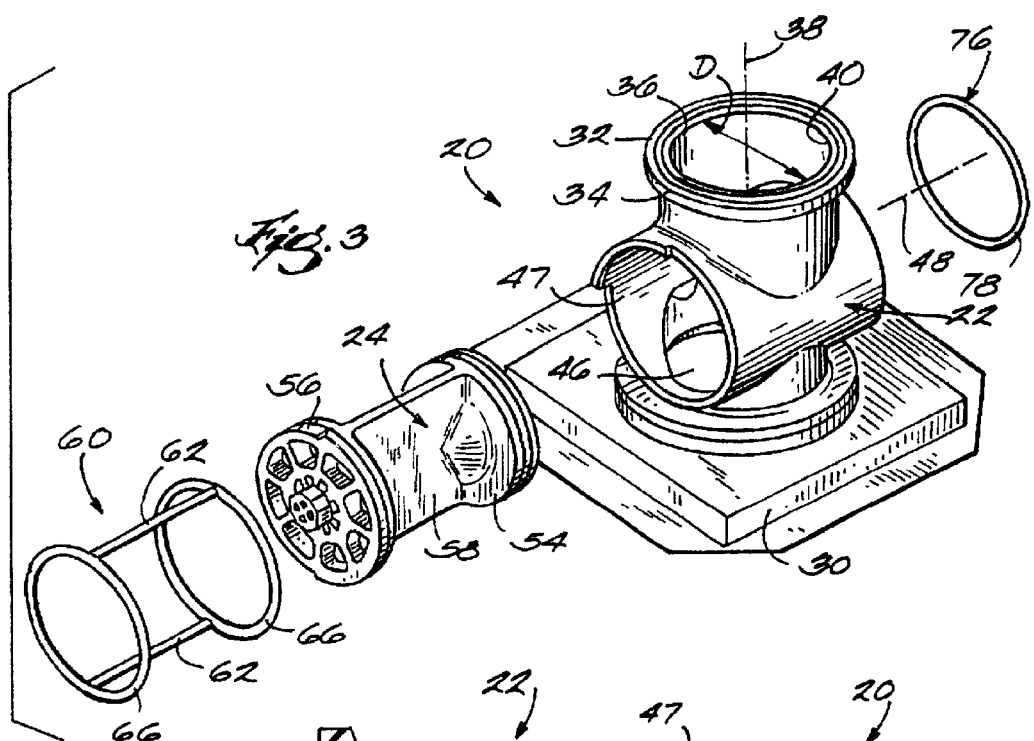

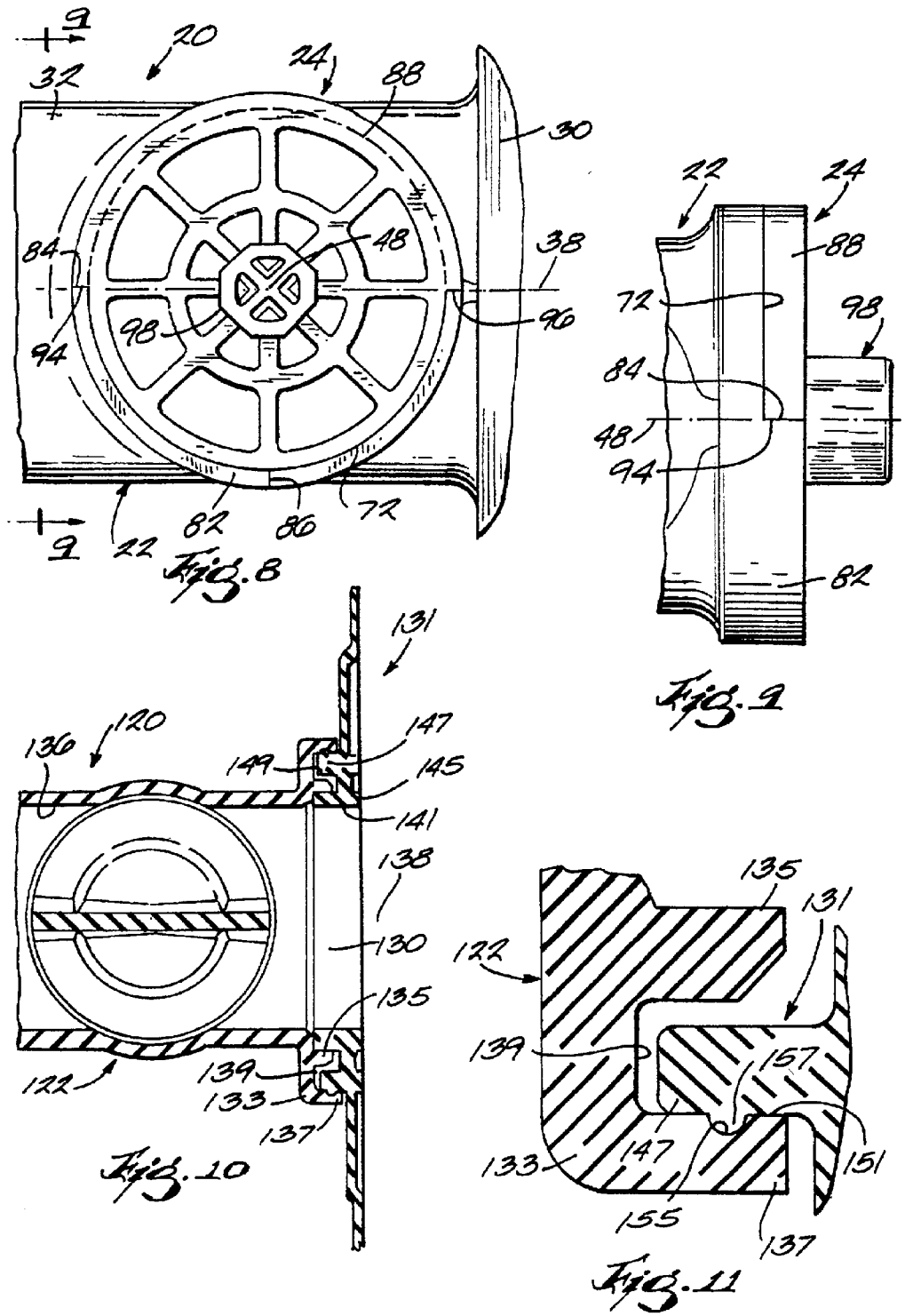

VALVE ASSEMBLY

FIELD OF THE INVENTION

The present invention relates generally to a valve assembly and, more particularly, to a valve assembly having a valve body with a valve element mounted therein to control product flow through the valve body.

BACKGROUND OF THE INVENTION

Valve assemblies are used in many different industries and in many different applications. Some applications require sterilization, such as in the medical industry or food industry, and others do not, such as in the petroleum industry, the powder products dispensation industry, the sewer industry, certain chemical industries, or any number of different industries. In one application, bulk containers for storing and transporting low density products are available in a vast array of sizes and shapes. In one form, such containers include a relatively rigid outer container or box of corrugated paper, or the like, and a flexible sealed inner bag or container. As noted, when food stuffs or other human consumables are stored and transported, an interior of the inner container is typically sterilized or otherwise aseptically treated to avoid contamination.

In general, the inner bag or container of such bulk containers is formed from such a material as to not adversely affect the materials held within the bag. After the inner bag or container is filled, it is placed in the outer container. If properly filled and sealed, the bag will contain no air that may damage or otherwise adversely affect the product during storage. An aseptic valve assembly is typically arranged in operable combination with the inner bag and extends to an exterior of the outer container for mass containment and at-will distribution of the product. It is also known to use the valve assembly to fill the inner bag with product.

As will be appreciated by those skilled in the art, the valve assembly arranged in operable combination with the inner container can take a myriad of designs. Suffice it to say, such a valve assembly includes a valve housing defining an inlet end and an outlet end. The inlet end of the valve housing is operably connected to the inner bag. A valve element, whose position controls flow of product from the container, is arranged in operable combination with the valve body or housing.

When the bulk container is used to store and transport food grade products, special and important concerns are presented regarding the valve assembly. For example, the valve assembly must be fabricated from a material capable of withstanding sterilization procedures. Accordingly, many of such valve assemblies are fabricated from stainless steel which is both corrosive resistant and can withstand relatively high temperatures thereby facilitating sterilization procedures. Moreover, the valve must be fabricated from a material which readily allows securement of such valve housing to the inner bag as through heat welding, sonic welding, adhesive, or other suitable and well known means.

After emptying, both the inner container or bag and valve assembly are often discarded. Accordingly, the valve assembly must be economical to manufacturer. As will be appreciated, stainless steel valves are relatively costly to manufacture and, thus, are not subject to being thrown away or disposed of after a single use.

Additionally, and from an ergonomic viewpoint, it is desirable for the valve assembly to operate without requiring a great deal of manual effort. In this regard, and especially when the product passing through the valve assembly is a liquid, the valve element is typically sealed relative to the inner surface of the valve housing to obstruct the flow of product through the valve assembly. Notably, valve assemblies, commonly referred to as "butterfly valves", are known to have a sealing device extending circumferentially about and between the valve element and the inner surface of the housing to which the valve element is sealed. The effort required to operate such valves, however, can be considerable. Accordingly, such valves do not ergonomically lend themselves to easy operation.

Thus, there is a need and a continuing desire for a valve assembly which lends itself to a myriad of different applications including, but not limited to securement to an inner bag of a container assembly, which is economical to manufacture, and which is ergonomically favorable to operation while maintaining a seal between the valve element and the valve housing.

SUMMARY OF THE INVENTION

In view of the above, and in accordance with the present invention, there is provided a valve assembly which addresses the problems and drawbacks associated with heretofore known valve assemblies while concurrently advancing the valve assembly art. It being understood that although the valve assembly according to the present invention is described and illustrated in connection with its use for a bulk container as described above, the valve assembly of the present invention is capable of use in other applications, and the bulk container discussed herein is merely shown and described as an example of one such application. In more specific terms, the valve assembly of the present invention includes a valve body including an elongated passage defining a first axis and a bore defining a second axis extending generally across, preferably normal to, the first axis. A valve element is mounted in the bore of the valve body for rotation between a closed position, wherein the valve element cooperates with a surface on the valve body, defined by a periphery of the bore, to obstruct movement of product through the passage, and an open position, wherein the valve element permits at-will distribution of the product through the passage and out of the valve body.

The passage in the valve body can take any of a myriad of cross-sectional shapes. In a preferred embodiment, a generally circular cross-sectional configuration is provided for the valve body passage. One feature of this invention relates to sizing the diameter of the bore within which the valve element rotates to be equal to or greater than a distance measured between any two opposed locations defined by an associated opening in the valve body passage.

The valve body can be fabricated from any number of different materials, such as metal, non-metal components, plastics, composite materials, or other suitable materials. In one form, the valve body defines stops for limiting rotational movement of the valve element between open and closed positions. In another form, an inlet end of the valve body is configured with a flange to facilitate attachment of the valve body to adjacent structure.

The valve element is preferably provided with radial flanges at opposed ends thereof for mounting the valve element for rotation within the bore of the valve body and about the second axis. Moreover, the valve element is provided with a central web extending between and sized relative to the outside diameter of the radial flanges. An exterior of the valve element slidably cooperates with an inner peripheral surface on the valve body defined by the bore through which the valve element extends. When the valve assembly is in a closed condition, the valve element web is positioned to obstruct product flow and, if desired, promotes sterilization of a dispersion zone on the valve assembly. In one form, the valve element is configured on an exterior thereof to facilitate manual rotation of the valve element between open and closed positions.

Structure is arranged in operable combination with the valve body and valve element for releasably maintaining the valve element in operable association with the valve body. In addition, when appropriate, the structure further promotes sterilization of the valve assembly by readily permitting the valve element to be removed from the valve body.

If desired, to enhance the sealing capability of the valve element relative the valve body, the valve element further preferably includes seal structure for restricting movement of product between the valve element and the valve body. In one form, such sealing structure includes a seal extending lengthwise of the valve element and generally parallel to the axis of rotation of the valve element. In another form, the seal structure includes a seal extending about and between each radial flange on the valve element and the valve body for restricting movement of product therepast.

Another feature of the present invention concerns providing a valve assembly which is configured with a rotatable valve element that obstructs product flow through the valve assembly as a function of the position of the valve element and which is designed to promote ergonomic movement of the valve element between positions.

Another feature of the present invention relates to an ability to fabricate the valve body and valve element from any of a plurality of materials thereby allowing the valve assembly to be economically manufactured from a material suitable for the particular valve assembly operation.

Still another feature of the present invention relates to an ability to readily disassemble the component parts of the valve assembly relative to each other thereby reducing the time required to effectively sterilize the component parts and promote interchangeability of component parts between like valve assemblies.

Still another feature of the invention relates to mounting the valve element within the valve body for rotation relative to a generally cylindrical interior surface thereby reducing manufacturing concerns while conjointly accomplishing an effective seal with a seal element extending generally parallel to the axis of rotation of the valve element.

These and other objects, aims and advantageous features of the present invention will become more readily apparent from the following detailed description, drawings, and appended claims.

BRIEF DESCRIPTION OF THE DRAWINGS

FIG. 1 is a schematic view of a container with a valve assembly for effecting either mass containment within or at-will distribution of product from the container.

FIG. 2 is an enlarged side elevational view, partially in section, illustrating one form of a valve assembly embodying features of the present invention.

FIG. 3 is an exploded perspective view of the valve assembly illustrated in FIG. 2.

FIG. 4 is a sectional view taken along line 4—4 of FIG. 2.

FIG. 5 is a longitudinal sectional view of the valve assembly showing a valve element conditioned to an open position.

FIG. 6 is an enlarged fragmentary cross-sectional view of a portion of the valve assembly of the present invention.

FIG. 7 is an enlarged sectional view of the area encircled in FIG. 4.

FIG. 8 is another enlarged fragmentary side elevational view of the valve assembly.

FIG. 9 is a fragmentary sectional view taken along line 9–9 of FIG. 8.

FIG. 10 is a longitudinal sectional view of an alternative form of the valve assembly of the present invention.

FIG. 11 is an enlargement of the area encircled in FIG. 10.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology use herein are for the purpose of description and should not be regarded as limiting.

DETAILED DESCRIPTION OF THE PREFERRED EMBODIMENTS

Referring to the drawings, wherein like reference numerals indicate like parts throughout the several views, there is shown in FIG. 1 one form of a bulk container, generally indicated by reference numeral 10, for holding and shipping various semi-liquid or liquid products or substances. The bulk container 10 generally includes a load supporting outer container 12 with a series of interconnected, and preferably paperboard, walls 14 and a foil or film bladder or inner container 16. The inner container 16 is typically comprised of a synthetic resin or plastic material which is inert with respect to the product filled into the bag 16. The bladder or bag 16 is located within the outer container 12 and is shaped and dimensioned such that, upon filling with a product, the bag 16 generally conforms to the inner contours of the outer container walls 14. According to the present invention, a valve assembly, schematically indicated by reference numeral 20, is provided in operable combination with the inner bag 16 and extends through an opening 18 defined by one of the walls 14 on the outer container 12. As noted above, it should be understood that although the valve assembly 20 is described and illustrated for use with the bulk container 10, the valve assembly 20 is capable of use in other applications, which may include aseptic or non-aseptic applications.

Referring now to FIGS. 2 and 3, valve assembly 20 includes a valve body or housing 22 and a valve element or actuator 24 mounted for rotation between closed and open positions within the valve body or housing 22. The components 22, 24 of the valve assembly 20 can be fabricated from any number of different materials suitable for a particular application. That is, the components 22, 24 of the valve assembly 20 can be fabricated from a material selected from metal, non-metal, plastic, or other composite materials capable of withstanding the associated environment.

As shown in FIG. 2, the valve body 22 includes an upstream or inlet end 30 and an axially aligned downstream or outlet end 32. In the embodiment shown, the upstream end 30 of the valve body 22 is adapted to open to an interior of the inner container 16. Preferably, the upstream end 30 of the valve body 22 is configured to facilitate attachment of the valve body 22 to the inner container 16. For example, the upstream end 30 of the valve body 22 may be ultrasonically sealed or otherwise operably secured to the inner container 16.

The downstream end 32 of the valve body 22 is axially spaced from the upstream end 30 a sufficient distance whereby allowing the valve body 22 to extend through and beyond the exterior wall or surface of the outer container 12. As shown in FIG. 2, preferably, the valve body downstream end 32 is configured with a generally circular flange 34, thereby enhancing the ability to releasably secure a pipe or hose 35 having a clamp 37 to the valve assembly 20 in a conventional manner. It being noted, of course, that in certain applications the flange 34 is not required as an attachment mechanism for an associated device. For example, it is contemplated that the valve assembly of the present invention could be used as an in-line valve, such as an in-line IV-valve, for use in the medical field. In such in-line applications, the flange 34 may or may not be necessary.

As illustrated in FIG. 3, valve body 22 is provided with a bore or passage 36 which opens to both the upstream and downstream ends 30 and 32, respectively, and through which product flows. The bore or passage 36 defines an elongated first axis 38. In the illustrated embodiment, the throughbore or passage 36 has a generally circular cross-sectional configuration between the opposed ends 30, 32 and a diameter D (see also FIG. 4) extending between two diametrically positioned points on a marginal edge 40. It should be appreciated, however, that the bore or passage 36 can have other cross-sectional configurations than that exemplified without detracting or departing from the spirit and scope of the present invention.

As illustrated in FIGS. 3 and 4, valve body 22 is furthermore provided with a second bore 46 between the upstream and downstream ends 30 and 32, respectively, of the valve body 22 and defining a second axis 48 extending generally across and preferably normal or perpendicular to the first axis 38. Moreover, axes 38 and 48 defined by passage 36 and bore 46, respectively, are arranged in generally coplanar relation relative to each other. As shown, the second bore or opening 46 defines a generally cylindrical-like inner surface 47 within the valve body 22. It is noted that the diameter of bore 46, within which the valve element 24 rotates, is sized to be equal to or greater than a distance measured between any two diametrically opposed locations defined on the marginal edge 40 of passage 36 in a plane intersecting with axis 38 and extending generally parallel to axis 48 within that portion of the passage 36 that is in communication with the upstream end 30. Stated differently, to close passage 36 so that product cannot pass therethrough, the valve element 24 is sized and configured to cooperate with the inner surface 47 of the valve body 22 so as to close the passage 36.

As illustrated in FIG. 4, valve body 22 defines a pair of cylindrical seats 50 and 52 axially aligned relative to each other and which open to opposed sides of the valve body 22. Valve element 24 is mounted within bore 46 for rotation about fixed axis 48. As shown in FIGS. 3 and 4, valve element 24 includes a pair of radial flanges or trunnions 54 and 56 disposed toward opposed ends of and which combine with the cylindrical seats 50, 52 on the valve body 22 to support valve element or actuator 24 for rotation about fixed axis 48. In the exemplary embodiment, the radial flanges 54, 56 are rigidly joined to each other by a solid web 58 having an outer dimension substantially equal to the diameter of the cylindrical-like inner surface 47 within the valve body 22 and the outer diameter of the radial flanges 54, 56. As such, when valve assembly 20 is in a closed position (FIG. 4), the radial flanges 54, 56 and web 58 of valve element 24 combine with the inner surface 47 of the valve body 22 to obstruct product flow and allow, if desired, for sterilization of the dispersion zone of the valve assembly 20. When valve assembly 20 is conditioned in an open position (FIG. 5), however, the web 58 of valve element 24 is positioned to permit product flow from container 10 (FIG. 1) through the passage 36 between the inlet and outlet ends 30 and 32, respectively.

As suggested, in certain applications it would be desirable to provide a seal between the valve element 24 and the valve body 22. To enhance a sealing engagement between valve element 24 and valve body 22, a seal structure 60 (FIG. 3) is preferably arranged in operable combination with the valve element 24. With reference to FIGS. 3 and 6, seal structure 60 includes an elongated, and preferably elastomeric, seal 62 extending longitudinally along each side or edge of the valve element web 58 and generally parallel to axis 48 in sealing engagement with the inner surface 47 of bore 46. Preferably, an elongated channel or slot 64 is provided along each side or edge of the web 58. As shown, the channel 64 opens to the inner surface 47 defined by bore 46. Each seal 62 is fixedly seated or accommodated within a slot 64 and operably combines with the valve element web 58 to inhibit product passing between the inner surface 47 and the valve element 24 as long as the valve element 24 is in a closed condition.

In a preferred embodiment and with reference to FIGS. 3 and 7, seal structure 60 furthermore includes an annular, and preferably elastomeric, seal 66 arranged in surrounding relation about each radial valve element flange 54, 56 (with only flange 54 being shown in FIG. 7) in rotational sealing engagement with the inner surface 47 of bore 46. In one form, a channel or slot 68 is provided around each valve element flange 54, 56 and opens to a respective cylindrical seat 50, 52. Each seal 66 is accommodated within a slot 68 and operably combines with a respective valve element radial flange 54, 56 to inhibit product to pass outwardly between surface 47 and the respective flange 54, 56 of element 24 regardless of the position of the valve element 24.

As will be appreciated, the elongated seals 62 on opposed sides of the web 58 along with the annular seals 66 can be formed as a one-piece seal structure. Alternatively, structure 60 can be integrated into valve element 24 through a well known and conventional overmolding process.

In one form, valve element 24 is releasably maintained within the valve body 22 to facilitate sterilization and repair/reconstruction of the valve assembly 20. With reference to FIGS. 4 and 7, cylindrical seat 50 extends outwardly from a side of the valve body 22 and terminates in a substantially flat surface 70 extending generally normal to axis 48. As discussed below, cylindrical seat 52 likewise extends outwardly from an opposite side of the valve body 22 and terminates in a face 72. Between opposed ends, valve element 24 has a length greater than the distance between surfaces 70 and 72 on the valve body 22. As such, and as illustrated in FIGS. 4 and 7, valve element 24 extends outwardly and beyond the valve seat 50.

With reference to FIGS. 3 and 7, structure 76 is provided in combination with the valve body 22 and valve element 24 for releasably maintaining and endwise positioning the valve element 24 within the valve body 22. With the exception noted below, valve element 24 has a generally constant diameter between opposed ends thereof, thus, allowing element 24 to slidably move endwise within the bore 46 of the valve body 22 during assembly and disassembly of valve assembly 20.

As illustrated in FIG. 7, structure 76 preferably includes an annular ring 78 which limits linear displacement of valve element 24 within the bore 46 of the valve body 22. In one form, an annular channel 80 is axially disposed outward from channel 68 and opens to the portion of radial flange 54 extending axially outward from seat 50 so as to accommodate or seat the annular ring 78 at least partially therewithin. Notably, the channel or slot 80 is positioned relative to the flat surface 70 of seat 50 such that ring 78 engages and presses against face 70 to allow for rotational movement of the valve element 24 between positions while restricting linear displacement of and, thus, positioning the valve element 24 in a first direction within bore 46 of the valve body 22. As should be appreciated, removal of the ring 78 from operable combination with the valve element 24 readily permits the valve element 24 to slide to the left, as shown in FIG. 7, relative to the valve body 22 to allow for repair/replacement of the valve element 24.

It should furthermore be appreciated that ring 78 can take any of numerous forms. For example, ring 78 can take the form of a conventional elastomeric O'ring. Alternatively, ring 78 can be a metal snap ring partially accommodated within the channel 80 while extending radially therefrom to permit interengagement with surface 70 on the valve body 22. Of course, other forms of rings or other conventional devices would equally suffice to effect positive positioning of and, yet, allow for removal of the valve element 24 relative to the valve body 22.

At its other end, valve element 24 is preferably configured to operably combine with the valve body 22 in restricting endwise or linear movement and positioning of valve element 24 within the bore 46 (FIG. 3) relative to the valve body 22 in a second direction opposed to the first direction. In the embodiment illustrated in FIGS. 8 and 9, surface 72 of valve body 22 has a stepped configuration. That is, an arcuate extension 82 projects axially away from the remainder of valve body surface 72 whereby creating two shoulders or steps 84 and 86 which, in the illustrated embodiment, are disposed about 90 degrees apart from one another.

At a distal end thereof, valve element 24 is provided with a radial flange 88 having a diameter greater than the diameter of bore 46 and extending around about a 180 degree outer segment of element 24. As will be appreciated from an understanding of the structure thereof, when element 24 is inserted into bore 46 of the valve body 22, flange 88 is positioned to move past the arcuate extension 82 until flange 88 abuts surface 72 thereby limiting movement of the valve element 24 to the left, as seen in FIG. 9, whereby endwise positioning valve element 24 in the second direction relative to bore 46 and valve body 22.

As shown in FIG. 8, opposed sides of flange 88 define two shoulders or steps 94 and 96 which are disposed approximately 180 degrees from each other and which, when valve element 24 is turned between positions, rotate in the same general plane as the shoulders or steps 84, 86 on the extension 82 of valve body 22 are disposed. Thus, the steps 84, 86 on the valve body 22 operably combine with the steps 94, 96, respectively, on the valve element flange 88 and act as stops to limit rotational movement of valve element 24. Moreover, the stops 84, 86 and 94, 96 are mnemonically positioned to indicate the condition or position of valve assembly 20.

Preferably, valve element 24 is exteriorly configured to facilitate manual rotation thereof between open and closed positions. In the embodiment shown in FIGS. 8 and 9, an axial extension 98 protrudes from one end of valve element 24. Extension 98 is preferably aligned with axis 48 and is configured for releasable engagement by a suitable tool, such as a wrench or the like, to promote turning movement of element 24 between positions. Of course, extension 98 can likewise be configured such that a removable handle can be readily and easily used to promote turning movement of element 24 between open and closed positions.

Another form or embodiment of valve assembly embodying principals of the present invention is illustrated in FIG. 10. This alternative form of valve assembly is designated generally by reference numeral 120. The elements of this alternative form of valve assembly that are identical or functionally analogous to those elements or components of the valve assembly 20 discussed above are designated by reference numerals identical to those used above with the exception this embodiment of valve assembly uses reference numerals in the one-hundred series.

As shown in FIG. 10, the upstream end 130 of valve body 122 of valve assembly 120 is configured to promote fixing an attachment plate or disc 131 thereto. In the embodiment illustrated, the upstream end 130 of valve body 122 defines a flange 133 extending radially outwardly from the valve body 122. Flange 133 includes an annular inner ring 135 and an annular outer ring 137 spaced at different radial distances relative to axis 138 of the valve body 122 and which define an annular open channel or slot 139 therebetween. Notably, both rings 135 and 137 are capable of radial flexure but return to a predetermined set position after being flexibly moved.

As shown, the attachment plate or disc 131 is sized to radially project outwardly beyond the limit of the valve body 122 thereby facilitating suitable attachment of the valve assembly 120 to container 10 (FIG. 1). The attachment plate or disc 131 defines an opening 141 which aligns with passage 136 in the valve body 122. Preferably, and to promote product flow through passage 136, opening 141 is sized generally equal to the bore 136 in valve body 122. An upstanding or projecting annular inner ring 145 surrounds the opening 141 with an outer annular ring 147 being concentrically arranged relative to inner ring 145 to define an open annular channel or slot 149 therebetween. The radial width of the annular channel 149 on the disc 131 is generally equal to the radial width of the annular inner ring 135 on the valve body 122. Preferably, the outer annular ring 147 on disc 131 has a radial width generally equal to the radial width of the annular channel or slot 139 on the valve body 122.

Suitable interlocking instrumentalities are provided on the valve body 122 and the attachment plate or disc 131 whereby securing the parts together. One form of interlocking instrumentality for securing valve body 122 and disc 131 in interlocked relation is illustrated in FIG. 11. As shown, an annular inner surface 151 of the outer annular ring 137 on the valve body flange 133 defines an annular notch or groove 155 which is sized and configured to accommodate an annular protrusion 157 extending radially outward from the outer annular ring 147 on disc 131. As will be appreciated, urging the ring 147 on disc 131 into the slot 139 on the valve body 122 causes the interlocking instrumentalities to conjoin relative to each other thereby securing the valve body 122 and disc 131 in interlocked relation. Of course, and as will be appreciated, other forms of interlocking instrumentalities would equally suffice. Moreover, other interlocking instrumentalities can also be provided between the inner annular ring 135 on the valve body 122 and the inner annular ring 145 on the disc 131.

As will be appreciated, the valve assembly according to one aspect of the present invention, provides for either mass containment or at-will distribution of any number of different materials, substances, or products, such as, low density product mixtures while, if desired, maintaining a sterile environment in a dispersion zone of the valve assembly. One feature of the present invention relates to the ability to manufacture the valve assembly from any of several different materials. The valve assembly can be designed as a permanent fixture of a container subsequently filled with mass transported substances, and, depending upon the material from which the valve assembly is fabricated, allows the container to be disposed of rather than recycled, thus, significantly reducing transportation costs for such materials by reducing the labor intensive aspect associated with sterilization procedures for each container.

Independent of the material used to manufacture the valve assembly, the components of the valve assembly of the present invention are readily replaceable and reusable. Removal of the valve element or actuator from the valve assembly is readily affected as through structure 76. Moreover, structure 76 is readily accessible from an exterior of the valve assembly thereby reducing the time and effort required to service the valve assembly.

A feature of the present invention relates to sizing the diameter of bore 46 to be equal to or greater than a distance measured between any two opposed locations defined on a marginal edge of the inlet end of passage 36. Such a valve assembly design offers several advantages to the present invention. First, such design allows the rotatable valve element to be designed with edges which seal relative to an inner surface of the valve body and extend generally parallel to the axis of valve element rotation. As such, an improved force distribution and no preload forces are provided along the sealing edges of the valve element as compared to butterfly valves, thus, yielding advantageous ergonomic operation of the valve assembly. Second, such design allows the valve element to impart a wiping action to the inner surface of the valve body as the valve element rotates between closed and open positions. As will be appreciated by those skilled in the art, imparting a wiping action to the inner surface against which the valve element seals, effectively removes from the sealing surfaces contaminants which would normally adversely impact on the sealing capability of the valve assembly, thus, enhancing the sealing capability of the valve assembly. Third, such design facilitates assembly/disassembly of the valve assembly. Since the valve element is sized larger than the passage which it seals, the rotatable valve element is readily replaceable and repairable. Moreover, this design promotes versatility and sterilization of the components parts of the assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art. Various features of the invention are set forth below.

What is claimed is:

1. A valve assembly comprising:
   a valve body having a passage defining a first axis, and a bore defining a second axis disposed in crossing relation to the first axis, the bore having an inner surface defined by an inner periphery thereof, a first open end, and a second spaced apart open end; and
   a valve structure including a pair of radial flanges disposed at opposed ends with a solid web member extending therebetween, the radial flanges being configured to mount the valve structure within the bore for rotation about the second axis between a closed position, wherein the valve structure cooperates with the inner surface of the bore to obstruct movement of product through the passage, and an open position, wherein the valve structure is positioned relative to the inner surface of the bore so as to permit product movement through the passage, the radial flanges being structured and arranged so as to close the first and second open ends of the bore, wherein the valve structure includes a seal structure having a first seal portion extending lengthwise on one side of the web member and generally parallel to the axis of rotation of the valve structure, a second seal portion extending lengthwise on an opposite side of the web member and generally parallel to the axis of rotation of the valve structure, a third seal portion extending around one of the radial flanges, and a fourth seal portion extending around the other radial flange, thereby creating a seal between the valve structure and the bore to prevent movement of product therepast when the valve structure is in the closed position.

2. A valve assembly according to claim 1, wherein the web member is generally rectangular in shape.

3. A valve assembly according to claim 1, wherein a diameter of the bore is substantially equal to or greater than a distance measured across that portion of the passage which the valve structure is adapted to close.

4. A valve assembly according to claim 1, wherein the second axis is generally coplanar with and normal to the first axis.

5. A valve assembly according to claim 1, wherein the valve structure includes the seal structure extending lengthwise of and generally parallel to the axis of rotation of the valve structure, such that when the valve structure is in the closed position, the valve structure and the bore create a straight line seal therebetween so that a force created between the seal structure and the bore along the seal line does not substantially increase or vary as the seal structure rotates between the open and closed positions, thereby enhancing ergonomic operation of the valve structure.

6. A valve assembly according to claim 5, wherein the seal structure applies a wiping action to the cooperative inner surface of the bore as the valve structure moves between the open and closed positions.

7. A valve assembly according to claim 1, wherein the web member and flanges each include an appropriate slot adapted to receive the respective seal portion.

8. A valve assembly according to claim 1, wherein the seal structure is made of a single piece of material.

9. A valve assembly according to claim 1, wherein the seal structure is an elastomeric seal.

10. A valve assembly for use with a product holding container, the valve assembly comprising:
    a one-piece valve body having a generally cylindrical passage defining a first axis, a smooth inner surface, an inlet end, and an outlet end, and a generally cylindrical bore defining a second axis arranged generally coplanar with and normal to the first axis and between the inlet and outlet end of the passage, the bore having an inner surface defined by an inner periphery, a first open end, and a second spaced apart open end, the valve body further having a pair of spaced apart cylindrical seats axially aligned relative to each other and which open to opposed sides of the valve body;

a valve structure including a pair of radial flanges disposed at opposite ends with a generally rectangular solid web member extending therebetween, and a seal structure extending lengthwise of and generally parallel to opposite sides of the web member, the radial flanges being configured to mount the valve structure within the bore so as to close the first and second open ends of the bore and to cooperate with the cylindrical seats on the valve body to support the valve structure for rotation about the second axis between a closed position, wherein the seal structure cooperates with the bore to obstruct movement of product through the passage, and an open position, wherein the valve structure cooperates with the bore to permit product movement through the passage; and wherein a diameter of the bore, as well as the distance between the cylindrical seats, is equal to or greater than a distance measured between any two diametrically opposed locations on a marginal edge of the passage.

11. A valve assembly according to claim 10, wherein the product holding container is a liquid container having an Outer container in surrounding relation to an inner container, and wherein the valve body includes an outer flange member adapted to facilitate attachment of the valve body to the inner container.

12. A valve assembly according to claim 10, wherein the seal structure has a first seal portion extending lengthwise on one side of the web member and generally parallel to the axis of rotation of the valve structure, a second seal portion extending lengthwise on an opposite side of the web member and generally parallel to the axis of rotation of the valve structure, a third seal portion extending around one of the radial flanges, and a fourth seal portion extending around the other radial flange, thereby creating a seal between the valve structure and the bore to prevent movement of product therepast when the valve structure is in the closed position.

13. A valve assembly according to claim 12, wherein the web member and flanges each include an appropriate slot adapted to receive the respective seal portion.

14. A valve assembly according to claim 12, wherein the seal structure is made of a single piece of material.

15. A valve assembly according to claim 12, wherein the seal structure is an elastomeric seal.

16. A valve assembly according to claim 10, wherein the valve body and the valve structure are each made of a nylon material.

17. A valve assembly according to claim 10, further including stops for limiting movement of the valve structure between the open and closed positions.

18. A valve assembly according to claim 10, further comprising a rotation assistance device positioned on one end of one of the flanges to allow the valve structure to be rotated between the open and closed positions.

* * * * *